United States Patent [19]

Dubrow et al.

[11] Patent Number: 4,950,546

[45] Date of Patent: * Aug. 21, 1990

[54] RADIATION GRAFTING OF ORGANOPOLYSILOXANES

[75] Inventors: Robert S. Dubrow, Redwood City; Catherine A. Dittmer, Mountain View; William D. Uken, Fremont, all of Calif.

[73] Assignee: Raychem Corporation, Menlo Park, Calif.

[ * ] Notice: The portion of the term of this patent subsequent to Feb. 17, 2004 has been disclaimed.

[21] Appl. No.: 233,941

[22] Filed: Aug. 18, 1988

Related U.S. Application Data

[63] Continuation of Ser. No. 57,707, Jun. 1, 1987, abandoned, which is a continuation of Ser. No. 730,691, May 2, 1985, abandoned.

[51] Int. Cl.$^5$ ................................................ B32B 9/04
[52] U.S. Cl. ..................................... 428/447; 428/412; 428/420
[58] Field of Search .......................... 428/420, 412, 447

[56] References Cited

U.S. PATENT DOCUMENTS

| | | |
|---|---|---|
| 2,904,481 | 9/1959 | Lawton et al. . |
| 3,179,546 | 4/1965 | Fisher ................................ 525/474 |
| 3,669,796 | 6/1972 | Hall et al. . |
| 3,939,049 | 2/1976 | Ratner et al. . |
| 3,983,298 | 9/1976 | Hahn et al. .......................... 428/447 |
| 4,064,027 | 12/1977 | Gant .................................... 528/42 |
| 4,163,082 | 7/1979 | Romenesko ......................... 428/447 |
| 4,435,476 | 3/1984 | Phillips et al. ...................... 428/412 |
| 4,550,059 | 10/1985 | Dalton et al. ....................... 428/412 |
| 4,643,924 | 2/1987 | Uken et al. . |
| 4,680,233 | 7/1987 | Camin et al. ....................... 428/447 |
| 4,690,831 | 9/1987 | Uken et al. . |

FOREIGN PATENT DOCUMENTS

| | | |
|---|---|---|
| 0006705 | 2/1983 | European Pat. Off. . |
| 912259 | 12/1962 | United Kingdom . |

*Primary Examiner*—Lorraine T. Kendell
*Attorney, Agent, or Firm*—Stephen A. Zavell; Herbert G. Burkard

[57] ABSTRACT

This invention provides for the radiation grafting of certain organopolysiloxanes to polymeric supports. The organopolysiloxane material is partially crosslinked mixture which contains from about 10% to about 90% by weight of uncrosslinked organopolysiloxane oil and has a cone penetration of about 100 to about 350 ($10^{-1}$mm) and an ultimate elongation of at least about 100%. The organopolysiloxane fluid may be placed on the polymeric support and crosslinked to produce an organopolysiloxane material having the above properties and being bonded to the polymeric support. The organopolysiloxane material also can be crosslinked to the above properties by conventional means then placed in contact with the polymeric support and irradiated to crosslink the material to the polymeric support without substantially changing the properties of the organopolysiloxane material.

10 Claims, No Drawings

RADIATION GRAFTING OF ORGANOPOLYSILOXANES

This application is a continuation of application Ser. No. 057,707 filed June 1, 1987 now abandoned which is a continuation of application Ser. No. 730,691 filed May 2, 1985 now abandoned.

FIELD OF THE INVENTION

This invention relates to the radiation grafting of organopolysiloxane materials to polymeric supports wherein the grafted organopolysiloxane material is a mixture of crosslinked and uncrosslinked organopolysiloxane.

BACKGROUND OF THE INVENTION

Organopolysiloxane materials having a cone penetration between about 100 and 350 ($10^{-1}$ mm) (ASTM No. D217-68) and an ultimate elongation of at least 100% (ASTM No. D638-80) contain a mixture of crosslinked and uncrosslinked organopolysiloxane. The uncrosslinked organopolysiloxane oil may constitute from about 10% to about 90% by weight of the mixture but may be between 25 and about 75% by weight and more usually may be between about 30% to about 70% by weight These materials are useful as sealants and for forming protective covers over various substrates to protect the substrates from environmental conditions, moisture, or other undesirable elements. The various properties of these materials such as the elasticity, conformability, self-healing properties, elongation and other aspects make these materials very attractive as sealants for various substrates. In particular these materials are attractive because they can be repeatedly removed from and replaced on the various substrates without substantial loss of the adhesion to the substrate due to the surface tackiness of the organopolysiloxane material.

These materials generally have a very high surface tackiness. However, due to the uncrosslinked oil content of the mixture it is difficult to adhere the mixture preferentially to one surface, such as a support member, as opposed to another surface, such as a substrate, so that the organopolysiloxane material may be applied to a substrate and then removed from the substrate by adhesion to the support member.

In order to be useful in many applications, these organopolysiloxane materials must be used in combination with a support or container by which the material may be handled. These types of materials have been used in various containers and cast in a flexible matrix and used with release papers as illustrated by copending applications U.S. Ser. No. 434,011 filed Oct. 12, 1982; U.S. Ser. No. 507,433 filed June 23, 1983; U.S. Ser. No. 507,435 filed June 23, 1983; and U.S. Ser. No. 688,849 filed Jan. 4, 1985; which are incorporated herein by reference. In these applications the organopolysiloxane material is generally held to the container or support by the mechanical configuration thereof or in the case of release papers the material is placed between two substrates without the intent of removal and reuse.

It is desirable to have these organopolysiloxane materials adhere to a support material, such as a polymeric sheet or tape, with a force greater than the adhesive force with which it bonds to a substrate through surface tackiness or other mechanism. In general it is desirable to have these organopolysiloxane materials bonded to a support with a bond strength greater than the cohesive strength of the organopolysiloxane material itself.

Apparently due to the uncrosslinked oil content of these organopolysiloxane material attempts to bond the material to a support have met with limited success. In copending application U.S. Ser. No. 560,344 filed Dec. 12, 1983, it is disclosed that neoprene contact adhesive will bond a support to urethane materials having similar properties and characteristics including an uncrosslinked oil content. It has been found that contact adhesives will not bond the organopolysiloxane materials of this invention to supports. In copending application U.S. Ser. No. 711,119 filed Mar. 12, 1985, it is disclosed that elastomeric sealants having properties and characteristics similar to the organopolysiloxane materials of this invention will bond to certain porous polymeric support materials. In copending application U.S. Ser. No. 730,404 filed of even date herewith, it is disclosed that organopolysiloxane materials of this invention may be bonded to a support material with a silicone pressure sensitive adhesive.

It is believed that due to the uncrosslinked organopolysiloxane oil content present in the materials of this invention, it is completely unpredictable and unforeseen how these materials can be bonded to a support with a bond strength greater than the cohesive strength of the organopolysiloxane material itself.

Radiation grafting of various materials such as hard rubber is known in the art as illustrated by U.S. Pat. No. 3,179,546 to Fischer, U.S. Pat. No. 3,669,796 to Hall et al. and U.S. Pat. No. 3,939,049 to Ratner.

It is an object of this invention to bond such organopolysiloxane mixtures to polymeric support to thereby render the combination suitable for use as a tape or other protective article.

DESCRIPTION OF THE INVENTION

In one aspect this invention provides a method of forming an organopolysiloxane material bonded to a polymeric support comprising placing an organopolysiloxane fluid on a polymeric support; and irradiating said fluid and support with ultraviolet light or high energy radiation to crosslink a portion of said fluid to produce a material which is bonded to said support and which said fluid comprises a mixture of crosslinked organopolysiloxane and from about 10% to about 90% by weight uncrosslinked organopolysiloxane oil and has a cone penetraton between about 100 and about 350 ($10^{-1}$mm) and an ultimate elongation of at least about 100%.

In another aspect this invention provides a method of bonding an organopolysiloxane material to a polymeric support comprising contacting a polymeric support with material comprising a mixture of crosslinked organopolysiloxane and from about 10% to about 90% by weight uncrosslinked organopolysiloxane oil and having a cone penetration between about 100 and about 350 ($10^{-1}$mm) and an ultimate elongation of at least about 100%; and irradiating said polymeric support and organopolysiloxane material with ultraviolet light or high energy radiation sufficient to effect a bond of the organopolysiloxane material to the polymeric support but without substantially changing the cone penetration and ultimate elongation values of the organopolysiloxane material.

In another aspect this invention provides an article comprising a polymeric support and grafted thereon a mixture of a crosslinked organopolysiloxane and from about 10 to about 90% by weight uncrosslinked organopolysiloxane oil which mixture has a cone penetration of 100 to 350 ($10^-$mm) and an ultimate elongation of at least about 100%.

The organopolysiloxane material useful in this invention comprises any conventional organopolysiloxane which is unsubstituted or substituted with various functional groups. It can be a trimethyl terminated polydimethylsiloxane or may have various vinyl methyl or other functional groups on the terminal groups or on the backbone groups. The only requirement is that the organopolysiloxane can be crosslinked to provide a cone penetration in the range of about 100 to about 350 ($10^-$mm) and an ultimate elongation of at least about 100%.

The polymeric support can be any polymeric sheet or film which can function as a container for the organopolysiloxane material or as a flexible support for the material. Examples of such polymeric support include polyethylene, polystyrene, polypropylene, ethylene vinylacetate, polyvinylchloride, tetrafluoroethylene, polycarbonate, polysulfone, and the like. The polymeric support material should be selected to be compatible with the type and intensity of irradiation to be used because some polymeric materials tend to degrade under certain kinds of irradiation while others are resistant to some irradiation and may prevent the desired bonding at that irradiation type and level.

The irradiation according to this invention may be high intensity ultraviolet light when the organopolysiloxane fluid or material is present as a very thin layer on the polymeric support. For anything other than very thine layers of the organopolysiloxane fluid or material on the polymeric support it will be necessary to use high energy radiation such as electron beam, colbalt 60, x-ray, and the like.

As indicated above the irradiation should be sufficient to effect the bond of the organopolysiloxane material to the polymeric support without substantially changing the cone penetration and ultimate elongation values of the organopolysiloxane material. The cone penetration and ultimate elongation values will usually change to some extent, however they should not be allowed to change so substantially that they are changed to a different range of properties. Any change can be compensated for on a manufacturing basis by starting with a material which will provide the desired range of values at the conclusion of the irradiation to effect said bond.

In some combinations it will be helpful to include a prorad material or accelerator such as trialylcyanurate in the fluid or in the polymeric support.

The invention can be illustrated by the following examples.

EXAMPLE 1

The polydimethylsiloxane fluid used was Dow 200 having viscosity of 10,000 centistokes from Dow Corning. The fluid was poured onto the various backing materials, vacuumed to remove air, and irradiated to a dose of 11 Mrads with a 3.5 mev electron beam to produce a crosslinked organopolysiloxane on the support 2 mm in thickness and having a cone penetration of about 220 ($10^{-1}$ mm) and an ultimate elongation of about 400%. The samples were then submersed in a solvent for twenty-four hours. The following solvents were used with the respective substrates:

Acetone: 1, 2-polybutadiene, polycarbonate, silicone rubber, polyaryletherketone, polyurethane.
Chloroform: Nylon 11.
Isopropanol: Hytrel, polysulfone, PVC, polystyrene.
Methylene Chloride: EVA, high density polyethylene, polyvinyllidenefluoride, Mylar, polyDMS gel, polypropylene, tetrafluoroethylene, polyethylenetetrafluoroethylene.

Table 1 shows which bonds failed, which were weak bonds and which bonds were strong enough to induce cohesive failure of the crosslinked polydimethylsiloxane when it is peeled from the substrate.

TABLE 1
RADIATION GRAFTED BOND STRENGTHS BETWEEN CROSSLINKED POLYDIMETHYLSILOXANE AND VARIOUS POLYMERIC MATERIALS

| POLYMERIC MATERIAL | BOND STRENGTH | | |
|---|---|---|---|
| | Cohesive Failure | Some Bonding After Solvent | Separated in Solvent |
| EVA | X | | |
| High Density Polyethylene | X | | |
| HDPE w/prorad | X | | |
| Polyvinyllidenefluoride | X | | |
| Polyvinyllidenefluoride w/prorad | X | | |
| Mylar | | | X** |
| Nylon II | | X | |
| Nylon II w/prorad | | X | |
| 1,2-Polybutadiene | X | | |
| Polycarbonate | X | | |
| PolyDMS Gel | X | | |
| Polypropylene | X | | |
| Polystyrene | X | | |
| Polysulfone | X | | |
| PVC | | X | |
| Silicone Rubber | X | | |
| Polyaryletherketone | | | X** |
| Tetrafluoroethylene | | | X* |
| Tetrafluoroethylene w/glassfibers | X | | |
| Polyethylenetetrafluoracthylene | X | | |
| Polyethylenetetrafluoracthylene w/prorad | X | | |
| Polyurethane | X | | |

*The tetrafluoroethylene degraded under radiation.
**Radiation resistant materials which interferred with graft bonding.

EXAMPLE 2

Samples were taken of Nylon 11, Polyethylene, and Mylar support materials were coated with a 20 mil layer of Dow 200 fluid from Example 1.

Two sets of samples were made with each material. One set of samples consisted of the support, a polysiloxane layer, and another support layer; the other set of samples consisted of a support and a polysiloxane layer.

The six samples were then irradiated to a dose of 9 megarads on a 3.5 mev electron beam. After irradiation another piece of the same support material was placed on the samples having only one initial support material. Peel tests were then done to determine the failure mode of the bond formed, the results of which are listed in Table 2.

TABLE 2

| Sample | Material | Adhesive Failure | Cohesive Failure |
|---|---|---|---|
| 1 | Nylon II | | X |
| 2 | Nylon II | X | |
| 1 | Polyethylene | | X |
| 2 | Polyethylene | X | |
| 1 | Mylar | X | |

TABLE 2-continued

| Sample | Material | Adhesive Failure | Cohesive Failure |
|--------|----------|------------------|------------------|
| 2 | Mylar | | X |

Each Sample 1: Irradiated with polysiloxane in between two support material layers.
Each Sample 2: Irradiated with polysiloxane on one support material layer with second layer placed on after irradiation.

We claim:

1. An article comprising a polymeric support and grafted thereon a mixture of a crosslinked organopolysiloxane and from about 10 to about 90% by weight uncrosslinked organopolysiloxane oil which mixture has a cone penetration of about 100 to 350 ($10^{-1}$ mm) and an ultimate elongation of at least about 100%.

2. An article according to claim 1 wherein the uncrosslinked organopolysiloxane oil is present between about 25% and about 75%.

3. An article according to claim 2 wherein the uncrosslinked organopolysiloxane oil is present in an amount between about 30% and about 70% by weight.

4. An article according to claim 1 wherein the organopolysiloxane material comprises a polydimethylsiloxane.

5. An article according to claim 2 wherein the organopolysiloxane material comprises a polydimethylsiloxane.

6. An article according to claim 1 wherein up to about 5% of the polydimethylsiloxane is terminated with divinylmethylsiloxane groups.

7. An article according to claim 2 wherein up to about 5% of the polydimethylsiloxane is terminated with divinylmethylsiloxane groups.

8. An article according to claim 1 wherein the mixture is grafted on the support by electron beam irradiation.

9. An article according to claim 7 wherein the article is in the form of a tape.

10. An article according to claim 8 wherein the article is in the form of a tape.

* * * * *